(12) United States Patent
Narasimhulu et al.

(10) Patent No.: US 8,442,704 B2
(45) Date of Patent: *May 14, 2013

(54) SYSTEM AND METHOD FOR COMPUTING AN EQUI-DISTANCE POINT (EDP) FOR AIRCRAFTS

(75) Inventors: Veeresh Kumar Masaru Narasimhulu, Bangalore (IN); Dinesh Kumar Kushwaha, Bangalore (IN)

(73) Assignee: Airbus Engineering Centre India, Bangalore, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/388,060

(22) PCT Filed: Jul. 19, 2010

(86) PCT No.: PCT/IN2010/000478
§ 371 (c)(1),
(2), (4) Date: Jan. 31, 2012

(87) PCT Pub. No.: WO2011/027357
PCT Pub. Date: Mar. 10, 2011

(65) Prior Publication Data
US 2012/0130564 A1 May 24, 2012

(30) Foreign Application Priority Data
Aug. 6, 2009 (IN) ............................ 1875/CHE/2009

(51) Int. Cl.
*G06F 17/00* (2006.01)

(52) U.S. Cl.
USPC ............ 701/3; 701/4; 701/8; 701/10; 701/11; 701/13; 701/301; 701/411; 701/467; 701/528; 701/532; 340/945; 455/66.1; 455/98

(58) Field of Classification Search .................. 701/3, 4, 701/8, 10, 11, 13, 15, 16, 120, 122, 123, 701/301, 411, 467, 528, 532, 533; 244/76 R, 244/175, 186; 340/945; 455/66.1, 98
See application file for complete search history.

(56) References Cited

U.S. PATENT DOCUMENTS

| | | | | |
|---|---|---|---|---|
| 3,580,978 | A * | 5/1971 | Ebeling ............................ | 434/43 |
| 3,688,312 | A * | 8/1972 | Gustafson et al. .............. | 342/52 |
| 4,496,972 | A * | 1/1985 | Lippmann et al. ............. | 348/144 |
| 5,270,931 | A * | 12/1993 | Appleford ......................... | 701/3 |
| 6,965,816 | B2 * | 11/2005 | Walker ............................. | 701/16 |
| 8,140,257 | B2 * | 3/2012 | Villaume et al. ................ | 701/467 |
| 8,202,044 | B2 * | 6/2012 | Guemmer ................... | 415/173.7 |
| 8,280,562 | B2 * | 10/2012 | Villaume et al. .................. | 701/3 |
| 2008/0300739 | A1 * | 12/2008 | Coulmeau et al. ................. | 701/8 |
| 2009/0076721 | A1 * | 3/2009 | Coulmeau et al. ............. | 701/206 |
| 2009/0082955 | A1 * | 3/2009 | Sacle et al. .................... | 701/206 |
| 2010/0152996 | A1 * | 6/2010 | Blanchon et al. ............. | 701/120 |
| 2012/0109428 | A1 * | 5/2012 | Narasimhulu et al. .......... | 701/16 |
| 2012/0123616 | A1 * | 5/2012 | Narasimhulu ................... | 701/3 |

* cited by examiner

*Primary Examiner* — McDieunel Marc
(74) *Attorney, Agent, or Firm* — Prakash Nama; Global IP Services, PLLC

(57) ABSTRACT

A method for dynamically computing an equi-distance point (EDP) for an aircraft includes receiving at least two reference points for landing the aircraft upon an occurrence of an emergency, determining a remaining flight path for the aircraft based on a current location of the aircraft and a flight plan serviced by a flight management system (FMS) of the aircraft, and generating the EDP for the aircraft by locating a point on the remaining flight path which is equidistant from the at least two reference points.

20 Claims, 4 Drawing Sheets

SYSTEM AND METHOD FOR COMPUTING AN EQUI-DISTANCE POINT (EDP) FOR AIRCRAFTS

FIELD OF TECHNOLOGY

The present invention relates to the field of aeronautical engineering. In particular, the present invention relates to a flight management system.

BACKGROUND

A flight management system (FMS) is a fundamental part of an aircraft which is used to control a navigation of the aircraft. The FMS may hold a flight plan of the aircraft, and allow the pilot to modify the flight plan as required during the flight. The FMS uses various sensors to determine a position of the aircraft. Given the position and the flight plan, the FMS is able to guide the aircraft along the flight plan or flight path. The FMS is normally controlled through a small screen and a keyboard. The FMS also may display the flight plan on an electronic flight instrument system (EFIS), navigation display (ND) or multi-function display (MFD). Further, the FMS may compute predicted speed, altitude, fuel consumed along the flight plan, and so on.

An equi-distance point (EDP) may be computed by the FMS to safely navigate the aircraft, where the EDP may provide a point from which the distance to fly to two given reference points (e.g., two airports) is equal. The EDP may act as an advisory for the pilot during emergency situations where an emergency landing may be required. Currently, publicly visible methods for computing such a point appear to use a very simplified formula based on many approximations. Thus, the currently available methods may not be capable of determining the EDP which considers an equal distance from the two given reference points to the flight plan or flight path of the aircraft.

SUMMARY

A system and method for dynamically computing an equi-distance point (EDP) for aircrafts is disclosed. In one aspect, a method for dynamically computing an EDP for an aircraft includes receiving at least two reference points for landing the aircraft upon an occurrence of an emergency. The method further includes determining a remaining flight path for the aircraft based on a current location of the aircraft and a flight plan serviced by a flight management system (FMS) of the aircraft.

Furthermore, the method includes generating the EDP for the aircraft by locating a point on the remaining flight path which is equidistant from the at least two reference points. The point on the remaining flight path is located by forming a straight line between the first reference point and the second reference point, generating and extending a bisector line perpendicular to the straight line, and locating the point on the remaining flight path where the bisector line intersects.

In another aspect, an article includes a storage medium having instructions, that when executed by a computing platform, result in execution of the method described above.

In yet another aspect, a system for dynamically computing an EDP for an aircraft includes a processor, and a memory coupled to the processor. The memory is configured for storing a set of instructions, when executed by the processor, causes the processor to perform the method described above.

The methods, systems and apparatuses disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A system and method for dynamically computing an equi-distance point (EDP) for aircrafts is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
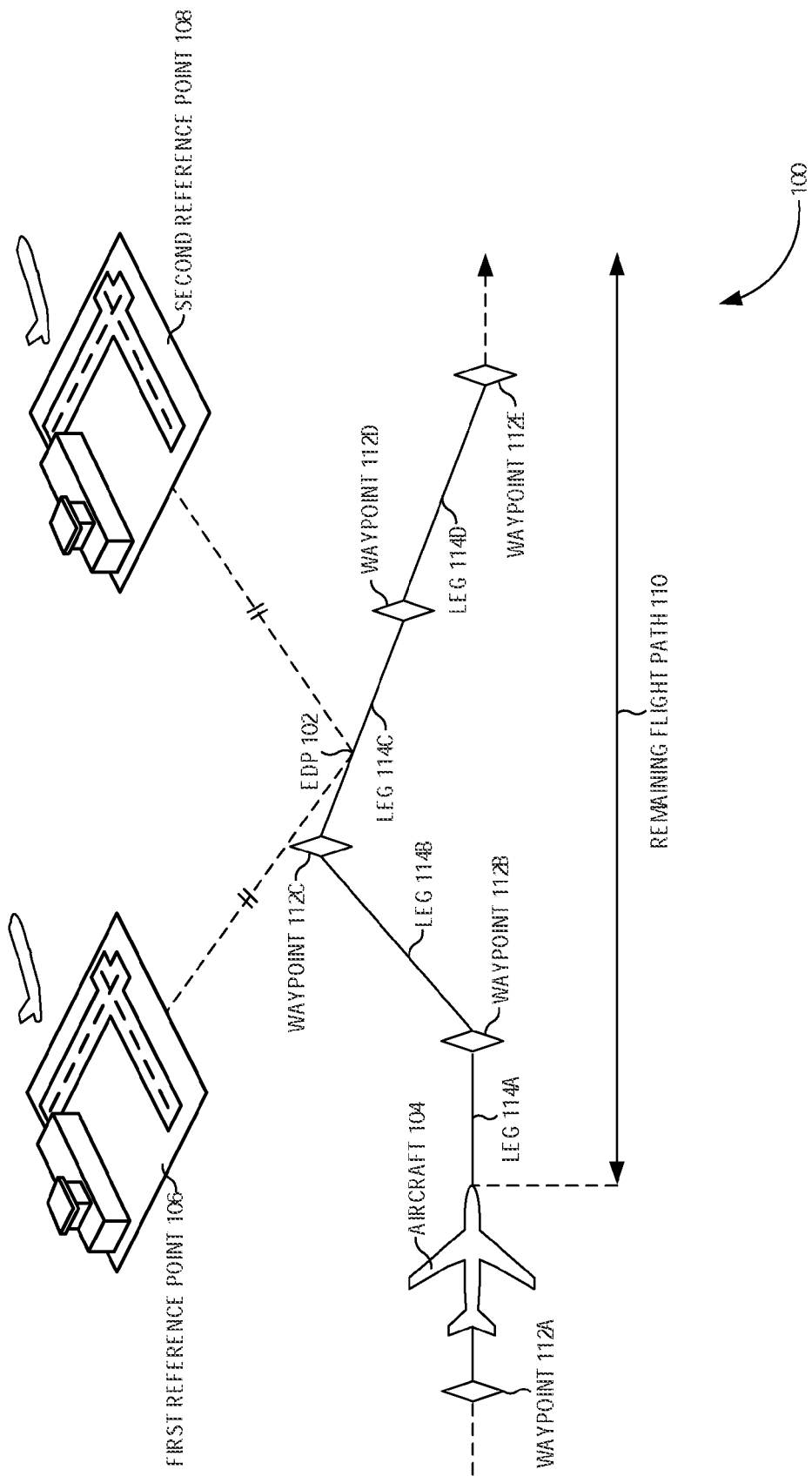
FIG. 1 illustrates an exemplary schematic representation illustrating generation of an EDP for an aircraft, according to an embodiment of the invention.

FIG. 1 illustrates an exemplary schematic representation 100 illustrating generation of an EDP 102 for an aircraft 104, according to an embodiment of the invention. In particular, FIG. 1 shows a flight plan serviced by flight management system (FMS) of the aircraft 104. The flight plan includes a plurality of waypoints 112A-E and a plurality of legs 114A-D. The waypoints 112A-E may be a set of coordinates (e.g., latitudinal and longitudinal coordinates) in physical space. The plurality of legs 114A-D represents a flight path of the aircraft 104.

According to an embodiment of the present invention, a first reference point 106 and a second reference point 108 are received by a flight management system (FMS) of the aircraft 104 for landing the aircraft 104 upon the occurrence of an emergency. In one embodiment, the first reference point 106 and the second reference point 108 may be entered by a pilot of the aircraft 104 based on a current location of the aircraft 104. In an alternate embodiment, the first reference point 106 and the second reference point 108 may be automatically selected by the FMS based on the current location of the aircraft 104.

The first reference point 106 and the second reference point 108 may be a departure airport and an arrival airport for the aircraft 104 by default. Alternatively, each of the first reference point 106 and the second reference point 108 may be an airport (other than the departure airport and the arrival airport), an airdrome, an airstrip, a runway, a landing field, an airfield and the like which is proximal to the current location of the aircraft 104. In one embodiment, more than two reference points can also be received from the pilot or automatically selected based on the current location of the aircraft 104.

Further, a remaining flight path 110 of the aircraft 104 is determined based on the current location of the aircraft 104 and the flight plan. The EDP 102 is then generated by locating a point on the remaining flight path 110 (e.g., on any of the plurality of legs 114B-D) which is equidistant from the first reference point 106 and the second reference point 108.

Figure 2:
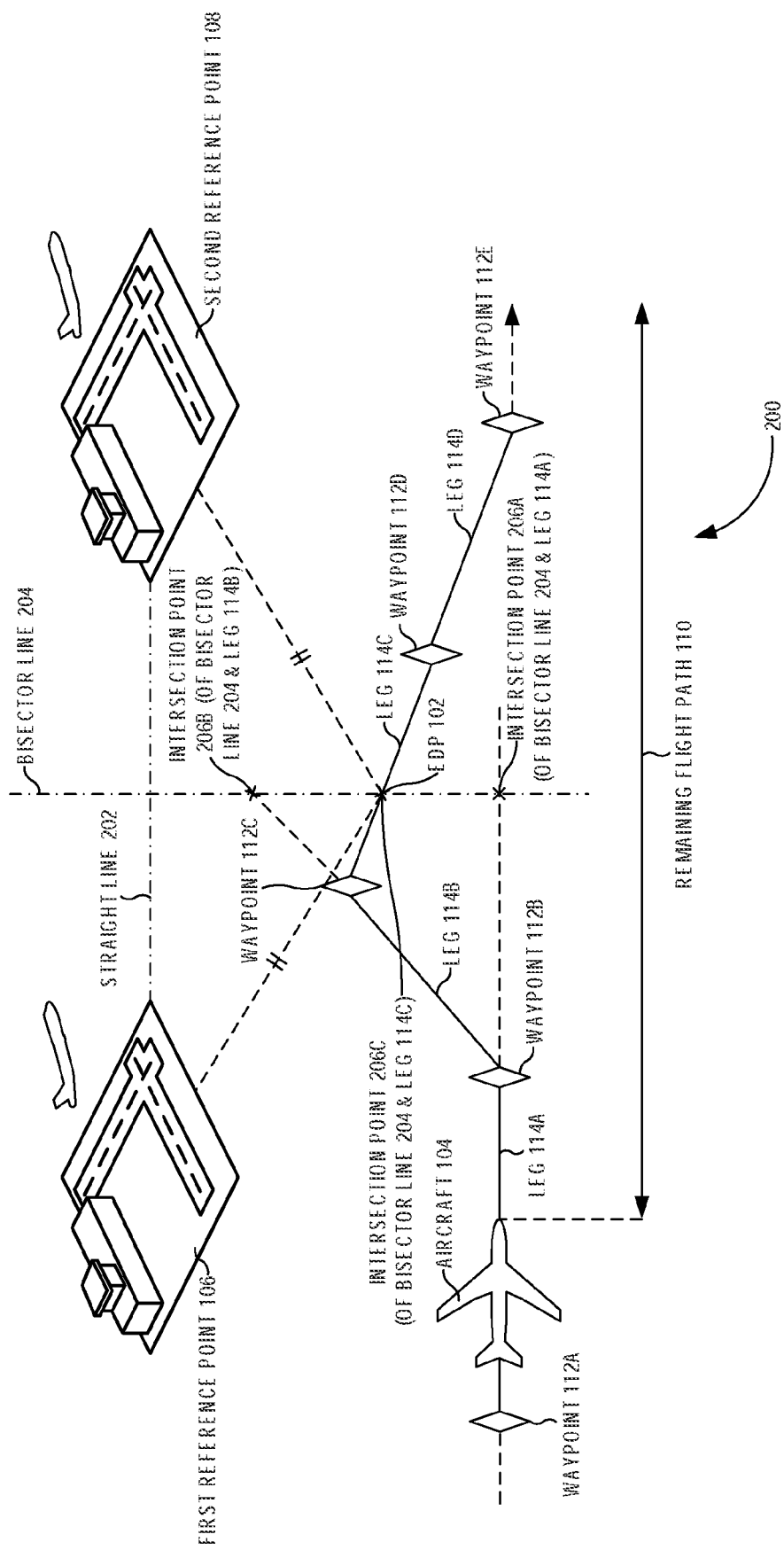
FIG. 2 illustrates an exemplary schematic representation illustrating computation of the EDP for the aircraft from FIG. 1 with respect to the remaining flight path, according to an embodiment of the invention.

FIG. 2 illustrates an exemplary schematic representation 200 illustrating computation of the EDP 102 for the aircraft 104 from FIG. 1 with respect to the remaining flight path 110, according to an embodiment of the invention. As discussed above, the EDP 102 is computed by locating a point on the remaining flight path 110 of the aircraft 104. For computing the EDP 102, a straight line 202 is formed between the first reference point 106 and the second reference point 108. The straight line 202 is formed using a first equation $Y_{ref}=M_{ref}X_{ref}+C_{ref}$ in Cartesian coordinates. The Cartesian coordinates include an X-axis and a Y-axis for defining a position of the aircraft 104. For example, the X-axis represents a longitudinal line at 0° and the Y-axis represents a latitudinal line at 0°. The slope ($M_{ref}$) of the straight line 202 is computed using the equation:

$$M_{ref} = \frac{Y_{ref2} - Y_{ref1}}{X_{ref2} - X_{ref1}},$$

where $X_{ref1}$ and $Y_{ref1}$ refer to longitude and latitude of the first reference point 106 and $X_{ref2}$ and $Y_{ref2}$ refer to longitude and latitude of the second reference point 108. Further, the intercept ($C_{ref}$) of a reference Y-axis for the straight line 202 is computed using $C_{ref}=Y_{ref2}-M_{ref}X_{ref2}$.

Then, a bisector line 204 is generated and extended perpendicular to the straight line 202. The bisector line 204 is generated using a second equation $Y_{perp}=M_{perp}X_{perp}+C_{perp}$ with $$M_{perp} = \frac{-1}{M_{ref}}$$

being a slope of the bisector line and $$C_{perp} = \frac{Y_{ref1} + Y_{ref2}}{2} + \frac{1}{M_{ref}}\left(\frac{X_{ref1} + X_{ref2}}{2}\right)$$

being an intercept of the reference Y-axis.

Further, intersection points of the bisector line 204 with the plurality of legs 114A-D in the remaining flight path 110 are located. In one embodiment, each of the plurality of legs 114A-D is based on a third equation $Y_{wpt}=M_{wpt}X_{wpt}+C_{wpt}$ in Cartesian coordinates with $$M_{wpt} = \frac{Y_{wpt2} - Y_{wpt1}}{X_{wpt2} - X_{wpt1}}$$

being the slope of the each of the plurality of legs 114A-D and $C_{wpt}=Y_{wpt2}-M_{wpt}X_{wpt2}$ being the intercept of the reference Y-axis. In the above equations for $M_{wpt}$ and $C_{wpt}$, $X_{wpt1}$ and $Y_{wpt1}$ refers to longitudinal and latitudinal coordinates of a first or start waypoint of each of the legs 114A-D and $X_{wpt2}$ and $Y_{wpt2}$ refers to longitudinal and latitudinal coordinates of a second or end waypoint of each of the leg 114A-D.

As illustrated, the bisector line 204 intersects the leg 114A at an intersection point 206A. Also, the bisector line 204 intersects the leg 114B at an intersection point 206B. Similarly, the bisector line 204 intersects the leg 114C at an intersection point 206C. Although it is not illustrated in FIG. 2, there can be more intersection points as there are more legs in the remaining flight path 110. Based on the intersection points 206A-C, the EDP 102 for the aircraft 104 is computed. In one embodiment, the EDP 102 for the aircraft 104 is computed by comparing a length of each of the plurality of legs 114A-C with a distance between a start point of each of the plurality of legs 114A-C and the corresponding intersection point. According to an embodiment of the present invention, an intersection point of a leg and the bisector line 204 is determined as the EDP 102 if the length of the leg is greater than the distance between the start point of the leg and the intersection point.

In the example embodiment illustrated in FIG. 2, the length of the leg 114B is compared with the distance between the start point of the leg 114B and the intersection point 206B. It can be seen from FIG. 2 that, the length of the leg 114B is less than the distance between the start point of the leg 114B and the intersection point 206B. Thus, the intersection point 206B is determined to be not the EDP 102. Further, the length of the leg 114C is compared with the distance between the start of the leg 114C and the intersection point 206C. It can be seen from FIG. 2 that, the length of the leg 114C is greater than the distance between the start point of the leg 114C and the intersection point 206C. Hence, the intersection point 206C is determined as the EDP 102.

Figure 3:
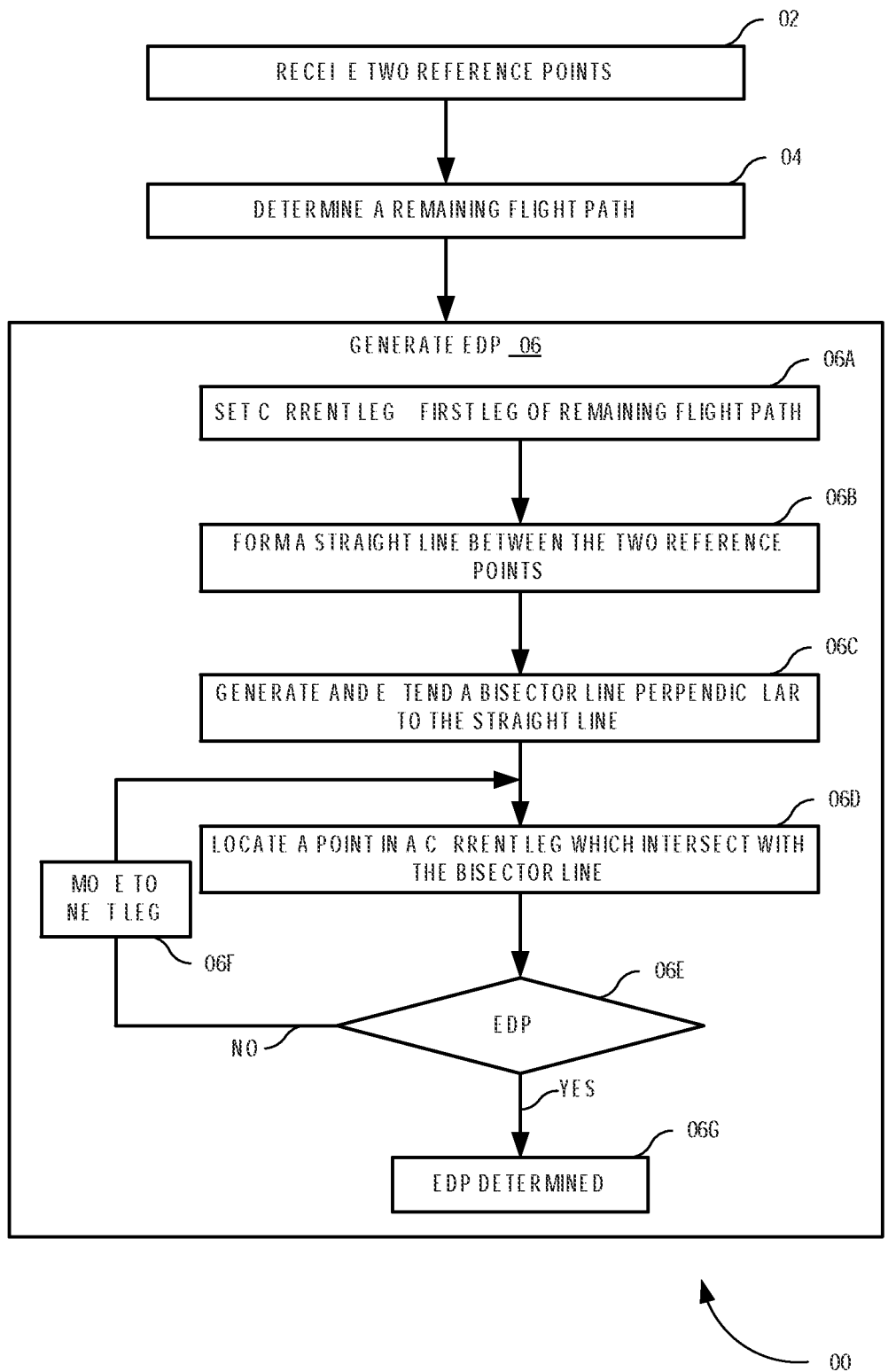
FIG. 3 illustrates a process flowchart of an exemplary method of a flight management system (FMS) for dynamically computing an EDP for an aircraft, according to an embodiment of the invention.

FIG. 3 illustrates a process flowchart of an exemplary method 300 of a flight management system (FMS) for dynamically computing an EDP for an aircraft, according to an embodiment of the invention. In step 302, two reference points for landing the aircraft is received. For example, the two reference points may be received from a pilot of the aircraft or may be automatically chosen, upon an occurrence of an emergency. In step 304, a remaining flight path for the aircraft is determined. The determination may be based on a current location of the aircraft and a flight plan serviced by the FMS of the aircraft.

The method 300 then performs step 306 in which the EDP for the aircraft is computed. In one embodiment, the EDP is computed by locating a point in the remaining flight path which is equidistant from the two reference points. The remaining flight path includes a plurality of way points and a plurality of legs. Moreover, the steps involved in computing the EDP are described in steps 306A through 306G. In step 306A, a first leg of the remaining flight path is set as a current leg. In step 306B, a straight line is formed between the two reference points. In step 306C, a bisector line is generated and extended perpendicular to the straight line.

In step 306D, a point in the current leg which intersects the bisector line is located. In step 306E, it is determined whether the intersected point is the EDP. The step is carried out by comparing the length of the current leg with the distance between the start point of the current leg and the intersected point. If the length of the current leg is greater than the distance between the start point of the current leg and the intersection point, then the intersection point is determined as the EDP in step 306G.

If the length of the current leg is less than the distance between the start point of the current leg and the intersection point, then the next leg in the remaining flight path is selected as the current leg in step 306F. Further, the step 306D is repeated to locate a point in the next leg which intersects with the bisector line. It is appreciated that steps 306E, 306F and 306G may be repeated until the EDP is determined. It is also appreciated that the steps 306A-G may use mathematical formulas described in FIG. 2 to obtain the EDP.

Figure 4:
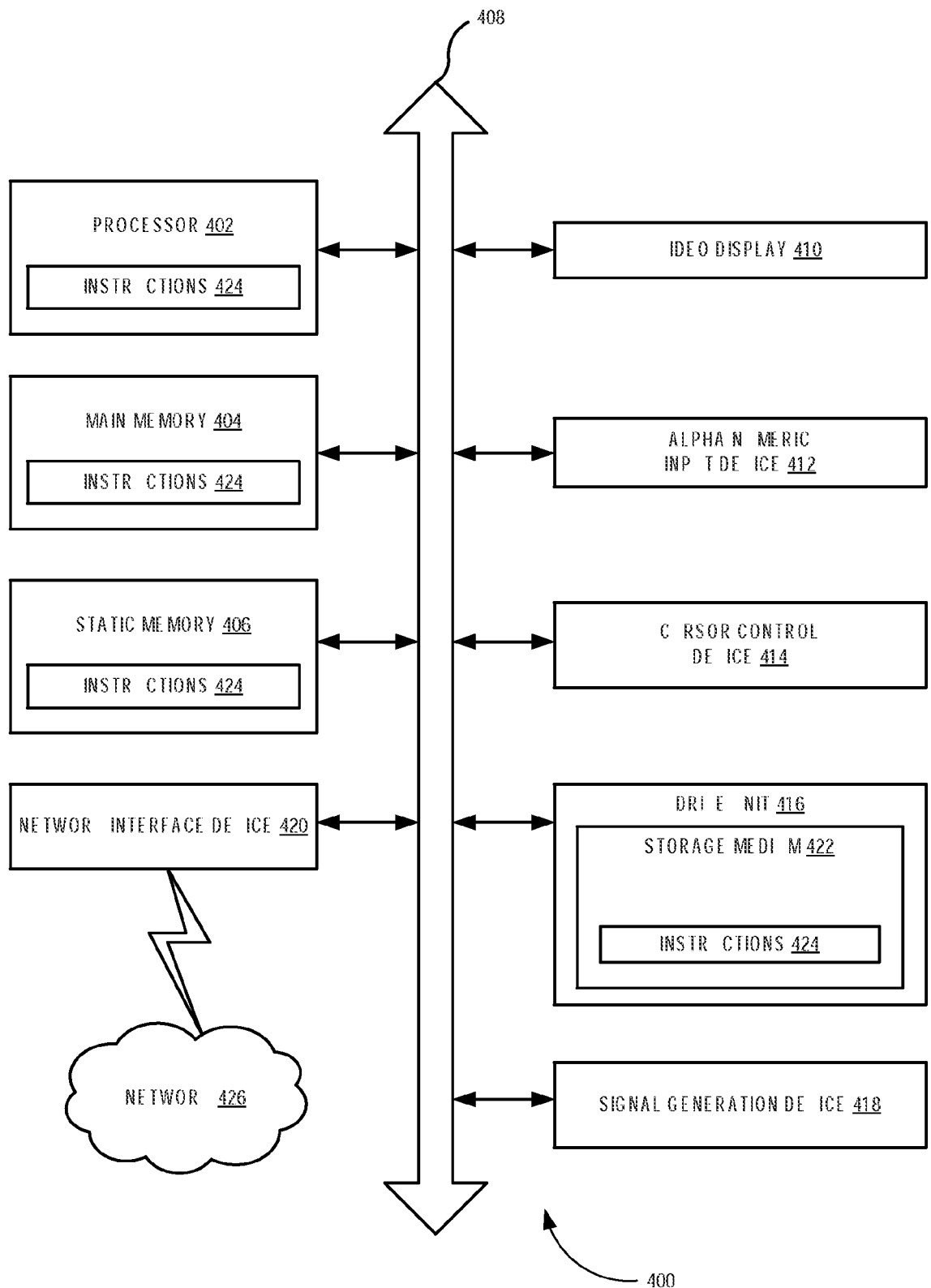
FIG. 4 illustrates a diagrammatic system view of a data processing system of a flight management system in which any of the embodiments disclosed herein may be performed, according to an embodiment of the invention.

FIG. 4 illustrates a diagrammatic system view 400 of a data processing system of a flight management system (FMS) in which any of the embodiments disclosed herein may be performed, according to an embodiment of the invention. Particularly, the diagrammatic system view 400 of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a storage medium 422, instructions 424, and a network 426.

The diagrammatic system view 400 may indicate a data processing system of a FMS of an aircraft or a flight simulator in which one or more operations disclosed herein are performed. The processor 402 may be a microprocessor, a state machine, an application specific integrated circuit, a field programmable gate array, etc. The main memory 404 may be a dynamic random access memory and/or a primary memory of the FMS. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a BIOS and/or a functional operating system of the data processing system. The network interface device 420 may perform interface functions (e.g., code conversion, protocol conversion, and/or buffering) required for communications to and from the network 426 between a number of independent devices (e.g., of varying protocols). The storage medium 422 may provide instructions on which any of the methods disclosed herein may be performed. The instructions 424 may provide source code and/or data code to the processor 402 to enable any one or more operations disclosed herein.

In one embodiment, a storage medium 422 has instructions 424, that when executed by a computing platform of the FMS, result in execution of a method for dynamically computing an EDP for the aircraft (e.g., the aircraft 104 of FIGS. 1 and 2). The method includes receiving at least two reference points (e.g., the first reference point 106 and a second reference point 108) for landing the aircraft upon an occurrence of an emergency. The method also includes determining a remaining flight path for the aircraft based on a current location of the aircraft and a flight plan serviced by a FMS of the aircraft.

Then, the method includes generating the EDP for the aircraft by locating a point on the remaining flight path which is equidistant from the at least two reference points. In one example embodiment, the point on the remaining flight path is located by forming a straight line between the first reference point and the second reference point, generating and extending a bisector line perpendicular to the straight line, and locating the point on the remaining flight path where the bisector line intersects.

The straight line is obtained using a first equation $Y_{ref}=M_{ref}X_{ref}+C_{ref}$ in Cartesian coordinates with $$M_{ref} = \frac{Y_{ref2} - Y_{ref2}}{X_{ref2} - X_{ref1}}$$

being a slope of the straight line and $C_{ref}=Y_{ref2}-M_{ref}X_{ref2}$ being an intercept of a reference Y-axis for the straight line. The bisector line is obtained using a second equation $Y_{perp}=M_{perp}X_{perp}+C_{perp}$ in Cartesian coordinates with $$M_{perp} = \frac{-1}{M_{ref}}$$

being a slope of the bisector line and $$C_{perp} = \frac{Y_{ref1} + Y_{ref2}}{2} + \frac{1}{M_{ref}}\left(\frac{X_{ref1} + X_{ref2}}{2}\right)$$

being an intercept of the reference Y-axis.

The remaining flight path includes a plurality of way points and a plurality of legs, and each of the plurality of legs is based on a third equation $Y_{wpt}=M_{wpt}X_{wpt}+C_{wpt}$ in Cartesian coordinates, with $$M_{wpt} = \frac{Y_{wpt2} - Y_{wpt1}}{X_{wpt2} - X_{wpt1}}$$

being a slope of the each of the plurality of legs and $C_{wpt}=Y_{wpt2}-M_{wpt}X_{wpt2}$ being the intercept of the reference Y-axis.

Moreover, for generating the EDP, the storage medium 422 may have instructions 424 to find an intersection point of the bisector line and each of the plurality of legs using the second equation and the third equation, and compare a length of the each of the plurality of legs with a distance between a start point of the each of the plurality of legs and the corresponding intersection point. The storage medium may also have instructions to determine the intersection point as the EDP when the length of the each of the plurality of legs is greater than the distance between the start point of the each of the plurality of legs and the corresponding intersection point.

In another embodiment, a FMS system comprises the main memory 404 coupled to the processor 402 which has instructions stored therein, that when executed by the processor 402 causes the processor 402 to perform the method described above.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

The invention claimed is:

1. A method of a flight management system (FMS) for dynamically computing an equi-distance point (EDP) for an aircraft, comprising:
   receiving, by a processor, at least two reference points for landing the aircraft upon an occurrence of an emergency;
   determining, by the processor, a remaining flight path for the aircraft based on a current location of the aircraft and a flight plan serviced by the flight management system (FMS) of the aircraft; and
   generating, by the processor, the EDP for the aircraft by locating a point on the remaining flight path which is equidistant from the at least two reference points.

2. The method of claim 1, wherein the at least two reference points are received from a pilot of the aircraft.

3. The method of claim 1, wherein the at least two reference points comprise a departure airport and an arrival airport for the aircraft by default.

4. The method of claim 1, wherein each of the at least two reference points for landing the aircraft comprises an airport.

5. The method of claim 1, wherein the at least two reference points comprise a first reference point and a second reference point.

6. The method of claim 5, wherein the locating the point on the remaining flight path comprises:
   forming a straight line between the first reference point and the second reference point;
   generating and extending a bisector line perpendicular to the straight line; and
   locating the point on the remaining flight path where the bisector line intersects.

7. The method of claim 6, wherein the straight line is formed using a first equation $Y_{ref} = M_{ref} X_{ref} + C_{ref}$ in Cartesian coordinates with $$M_{ref} = \frac{Y_{ref2} - Y_{ref1}}{X_{ref2} - X_{ref2}}$$

being a slope of the straight line and $C_{ref} = Y_{ref2} - M_{ref} X_{ref2}$ being an intercept of a reference Y-axis for the straight line.

8. The method of claim 7, wherein the bisector line is generated using a second equation $Y_{perp} = M_{perp} X_{perp} + C_{perp}$ in Cartesian coordinates with $$M_{perp} = \frac{-1}{M_{ref}}$$

being a slope of the bisector line and $$C_{perp} = \frac{Y_{ref1} + Y_{ref2}}{2} + \frac{1}{M_{ref}}\left(\frac{X_{ref1} + X_{ref2}}{2}\right)$$

being an intercept of the reference Y-axis.

9. The method of claim 8, wherein the remaining flight path comprises a plurality of way points and a plurality of legs, and wherein each of the plurality of legs is based on a third equation $Y_{wpt} = M_{wpt} X_{wpt} + C_{wpt}$ in Cartesian coordinates with $$M_{wpt} = \frac{Y_{wpt2} - Y_{wpt1}}{X_{wpt2} - X_{wpt1}}$$

being a slope of the each of the plurality of legs and $C_{wpt} = Y_{wpt2} - M_{wpt} X_{wpt2}$ being the intercept of the reference Y-axis.

10. The method of claim 9, wherein the generating the EDP comprises:
   finding an intersection point of the bisector line and the each of the plurality of legs using the second equation and the third equation;
   comparing a length of the each of the plurality of legs with a distance between a start point of the each of the plurality of legs and the intersection point; and
   determining the intersection point as the EDP when the length of the each of the plurality of legs is greater than the distance between the start point of the each of the plurality of legs and the intersection point.

11. An article, comprising:
   a non-transitory computer readable storage medium having instructions, that when executed by a computing platform of a flight management system (FMS), result in execution of a method for dynamically computing an equi-distance point (EDP) for an aircraft, comprising:
   receiving at least two reference points for landing the aircraft upon an occurrence of an emergency;
   determining a remaining flight path for the aircraft based on a current location of the aircraft and a flight plan serviced by a flight management system (FMS) of the aircraft; and
   generating the EDP for the aircraft by locating a point on the remaining flight path which is equidistant from the at least two reference points.

12. The article of claim 11, wherein the at least two reference points comprise a first reference point and a second reference point.

13. The article of claim 12, wherein the locating the point on the remaining flight path comprises:
   forming a straight line between the first reference point and the second reference point;
   generating and extending a bisector line perpendicular to the straight line; and
   locating the point on the remaining flight path where the bisector line intersects.

14. The article of claim 13, wherein the straight line is formed using a first equation $Y_{ref} = M_{ref} X_{ref} + C_{ref}$ in Cartesian coordinates with $$M_{ref} = \frac{Y_{ref2} - Y_{ref1}}{X_{ref2} - X_{ref1}}$$

being a slope of the straight line and $C_{ref} = Y_{ref2} - M_{ref} X_{ref2}$ being an intercept of a reference Y-axis for the straight line.

15. The article of claim 14, wherein the bisector line is generated using a second equation $Y_{perp} = M_{perp} X_{perp} + C_{perp}$ in Cartesian coordinates with $$M_{perp} = \frac{-1}{M_{ref}}$$

being a slope of the bisector line and $$C_{perp} = \frac{Y_{ref1} + Y_{ref2}}{2} + \frac{1}{M_{ref}}\left(\frac{X_{ref1} + X_{ref2}}{2}\right)$$

being an intercept of the reference Y-axis.

16. The article of claim 15, wherein the remaining flight path comprises a plurality of way points and a plurality of legs, and wherein each of the plurality of legs is based on a third equation $Y_{wpt}=M_{wpt}X_{wpt}+C_{wpt}$ in Cartesian coordinates with $$M_{wpt} = \frac{Y_{wpt2} - Y_{wpt1}}{X_{wpt2} - X_{wpt1}}$$

being a slope of the each of the plurality of legs and $C_{wpt}=Y_{wpt2}-M_{wpt}X_{wpt2}$ being the intercept of the reference Y-axis.

17. The article of claim 16, wherein the generating the EDP comprises:
   finding an intersection point of the bisector line and the each of the plurality of legs using the second equation and the third equation;
   comparing a length of the each of the plurality of legs with a distance between a start point of the each of the plurality of legs and the intersection point; and
   determining the intersection point as the EDP when the length of the each of the plurality of legs is greater than the distance between the start point of the each of the plurality of legs and the intersection point.

18. A flight management system (FMS) for dynamically computing an equi-distance point (EDP) for an aircraft, comprising:
   a processor; and
   a memory coupled to the processor and configured for storing a set of instructions, when executed by the processor, causes the processor to perform a method comprising:
   receiving at least two reference points for landing the aircraft upon an occurrence of an emergency;
   determining a remaining flight path for the aircraft based on a current location of the aircraft and a flight plan serviced by a flight management system (FMS) of the aircraft; and
   generating the EDP for the aircraft by locating a point on the remaining flight path which is equidistant from the at least two reference points.

19. The system of claim 18, wherein the at least two reference points are received from a pilot of the aircraft.

20. The system of claim 18, wherein the at least two reference points comprise a departure airport and an arrival airport for the aircraft by default.

\* \* \* \* \*